(12) United States Patent
Phadke et al.

(10) Patent No.: US 8,232,786 B2
(45) Date of Patent: Jul. 31, 2012

(54) FAST TRANSIENT STEP LOAD RESPONSE IN A POWER CONVERTER

(75) Inventors: Vijay G. Phadke, Pasig (PH); Arlaindo V. Asuncion, Paranaque (PH); Evan M. Espina, Zurich (CH); Yancy F. Boncato, Quezon (PH)

(73) Assignee: Astec International Limited, Kwun Tong, Kowloon (HK)

( * ) Notice: Subject to any disclaimer, the term of this patent is extended or adjusted under 35 U.S.C. 154(b) by 315 days.

(21) Appl. No.: 12/236,798

(22) Filed: Sep. 24, 2008

(65) Prior Publication Data

US 2009/0085546 A1 Apr. 2, 2009

Related U.S. Application Data

(60) Provisional application No. 60/997,051, filed on Sep. 28, 2007.

(51) Int. Cl.
*G05F 1/613* (2006.01)
*G05F 1/70* (2006.01)
*G05F 1/565* (2006.01)

(52) U.S. Cl. ......... 323/283; 323/222; 323/284; 323/285

(58) Field of Classification Search .............. 323/222, 323/282–285
See application file for complete search history.

(56) References Cited

U.S. PATENT DOCUMENTS

| | | | |
|---|---|---|---|
| 4,885,674 A * | 12/1989 | Varga et al. ............... 363/21.09 |
| 5,617,013 A | 4/1997 | Cozzi | |
| 5,731,692 A * | 3/1998 | Garcia ........................ 323/274 |
| 5,929,692 A * | 7/1999 | Carsten ....................... 327/531 |
| 6,064,187 A | 5/2000 | Redl et al. | |
| 6,087,816 A | 7/2000 | Volk | |
| 6,147,478 A | 11/2000 | Skelton et al. | |
| 6,169,669 B1 * | 1/2001 | Choudhury .................... 363/37 |
| 6,396,252 B1 | 5/2002 | Culpepper et al. | |
| RE37,738 E | 6/2002 | Brkovic | |
| 6,465,994 B1 | 10/2002 | Xi | |
| 6,472,856 B2 * | 10/2002 | Groom et al. ................. 323/284 |
| 6,518,738 B1 | 2/2003 | Wang | |
| 6,605,931 B2 | 8/2003 | Brooks | |
| 6,696,825 B2 * | 2/2004 | Harris et al. .................. 323/282 |
| 6,737,846 B1 | 5/2004 | Ben-Yaakov | |
| 6,784,649 B1 * | 8/2004 | Ohms .......................... 323/284 |
| 6,879,138 B2 * | 4/2005 | Dinh et al. .................... 323/284 |
| 6,894,471 B2 | 5/2005 | Corva et al. | |
| 6,897,641 B1 | 5/2005 | Herbert | |
| 7,006,362 B2 | 2/2006 | Mizoguchi et al. | |
| 7,615,982 B1 * | 11/2009 | Guo ............................ 323/285 |
| 2002/0171985 A1 * | 11/2002 | Duffy et al. .................... 361/90 |
| 2004/0046535 A1 | 3/2004 | Duffy et al. | |
| 2004/0232900 A1 | 11/2004 | Huang et al. | |
| 2006/0043952 A1 | 3/2006 | Huang | |
| 2006/0043954 A1 * | 3/2006 | Markowski ................... 323/283 |
| 2007/0067069 A1 * | 3/2007 | Markowski ................... 700/297 |

* cited by examiner

*Primary Examiner* — Adolf Berhane
*Assistant Examiner* — Fred E Fiinch, III
(74) *Attorney, Agent, or Firm* — Harness, Dickey & Pierce, P.L.C.

(57) ABSTRACT

A method of controlling a power converter having at least one switching device for supplying an output voltage and a load current to a load is disclosed. The method includes sensing the output voltage and sensing the load current. The method further includes controlling a duty cycle of the switching device according to the sensed output voltage and a voltage control loop when a rate of change of the load current does not exceed a threshold level. The method also includes adjusting the duty cycle of the switching device set by the voltage control loop when the rate of change of the load current exceeds the threshold level.

21 Claims, 7 Drawing Sheets

FAST TRANSIENT STEP LOAD RESPONSE IN A POWER CONVERTER

CROSS-REFERENCE TO RELATED APPLICATIONS

This application claims the benefit of U.S. Provisional Application No. 60/997,051 filed on Sep. 28, 2007. The entire disclosure of the above application is incorporated herein by reference.

FIELD

The present disclosure relates to power converters.

BACKGROUND

This section provides background information related to the present disclosure which is not necessarily prior art.

Many modern electronic systems demand high current slew rates. Such fast transient step loads require careful design of the voltage control loop and output filter of a power converter to keep voltage overshoots and undershoots within required specifications. This often results in a reduction in the output inductor and an increase in the switching frequency.

In a typical PFC boost pre-regulator, large voltage swings in the bulk power supply are an important factor for determining bulk capacitor specifications. For example, a typical PFC boost rail for regulating a voltage of 390 volts often requires a 450 volt bulk capacitor because the voltage over shoot during a load dump could be as high as 430 volts.

Similarly, in a typical voltage regulator module (VRM), a large number of expensive load capacitors are often used to meet high current slew rates. Because of this, a VRM typically includes smaller value output inductors and higher switching frequencies. Additionally, VRMs often utilize very high gains to respond to very small changes in output voltage. This can create stability problems in some VRMs.

SUMMARY

This section provides a general summary of the disclosure, and is not a comprehensive disclosure of its full scope or all of its features.

According to one aspect of the present disclosure, a method of controlling a power converter having at least one switching device for supplying an output voltage and a load current to a load is disclosed. The method includes sensing the output voltage, sensing the load current. The method also includes controlling a duty cycle of the switching device according to the sensed output voltage and a voltage control loop when a rate of change of the load current does not exceed a threshold level. The method further includes adjusting the duty cycle of the switching device set by the voltage control loop when the rate of change of the load current exceeds the threshold level.

According to another aspect of the present disclosure, a power converter includes a controller and at least one switching device. The controller is configured to control a duty cycle of the switching device according to a sensed output voltage and a voltage control loop when a rate of change of a load current does not exceed a threshold level. The controller is also configured to adjust the duty cycle of the switching device set by the voltage control loop when the rate of change of the load current exceeds the threshold level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
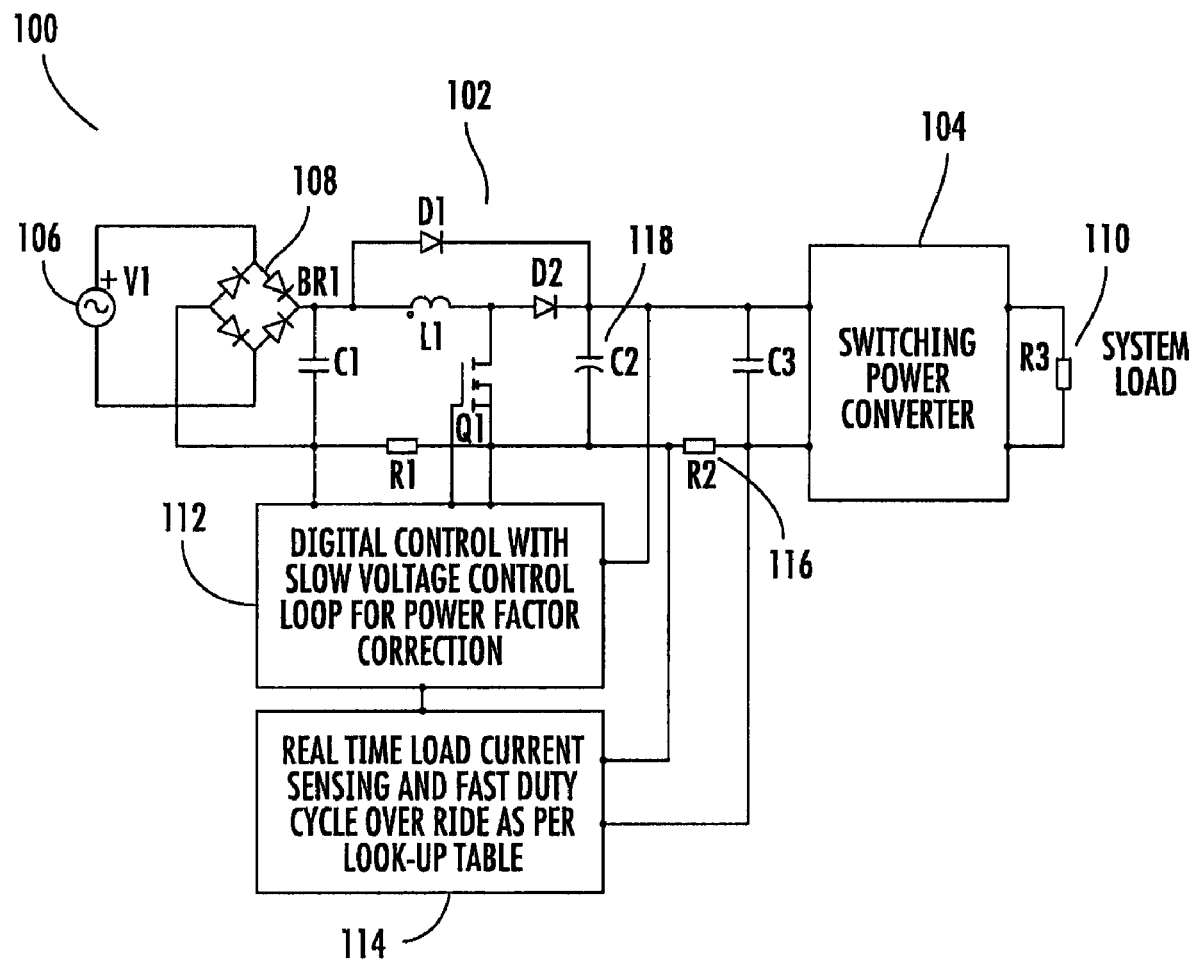
FIG. 1 is a circuit diagram of a power converter according to one embodiment including a PFC boost converter, a switching power supply, a controller and a sampling circuit.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

According to one aspect of the present disclosure, a method of controlling a power converter having at least one switching device for supplying an output voltage and a load current to a load is disclosed. The method includes sensing the output voltage and sensing the load current. The method also includes controlling a duty cycle of the switching device according to the sensed output voltage and a voltage control loop when a rate of change of the load current does not exceed a threshold level. The method further includes adjusting the duty cycle of the switching device set by the voltage control loop when the rate of change of the load current exceeds the threshold level.

The method can be used in any power converter topology having one or more switching devices where output current to a load can be sensed after the converter's bulk output capacitor. For example, the method may be used in a power factor correction (PFC) boost regulator, a voltage regulation module (VRM) and/or a DC-DC converter. By this method, stresses on bulk capacitors and changes in bulk voltage can be reduced. When applied in VRMs, the method can, among other things, reduce voltage overshoot and undershoot.

Example power converters for performing according to the aforementioned method will now be discussed with reference to FIGS. 1-7. It should be understood, however, that the method can be performed in a variety of other power converters without departing from the teachings of this disclosure.

FIG. 1 illustrates a power supply, generally indicated by the reference numeral 100 according to at least one aspect of the present disclosure. The power supply includes a PFC boost power converter 102 for providing an output voltage, and current, to a load. In the example power supply 100, the load is a switching power converter 104. An AC voltage from a voltage source 106 is rectified by a bridge rectifier 108 and input to the PFC boost power converter 102. The PFC boost power converter 102 provides power factor correction and supplies an output voltage that is input to the switching power converter 104. The switching power converter 104 supplies power to a load 110.

A controller 112 samples the voltage supplied by the PFC boost power converter 102. The controller 112 may be an analog or a digital controller. The controller 112 controls, among other things, the switching duty cycle of switching devices, such as Q1, in the PFC boost power converter 102 in order to regulate the output voltage of the PFC boost power converter 102. A current in the power converter 102 is sampled at a second frequency. In some embodiments, the second frequency is greater than the first frequency at which the voltage is sampled. In FIG. 1, the current is illustrated being sampled by a sampling circuit 114. The sampling circuit 114 may be a part of the controller 112, external circuitry or a combination of the two. The current is sensed using a series sense resistor 116 coupled to the converter 102 on the output side of a bulk output capacitor 118. Any other device capable of sensing the current, such as a current transformer, Hall Effect sensor, etc., can also be used instead of, or along with, the sense resistor 116.

As mentioned above, the sampling circuit 114 can be a discrete circuit, part of the controller 112, or a combination of the controller 112 and parts external to the controller 112. For example, the sampling circuit 114 may comprise external comparators which generate a logic level input to the controller 112 to indicate the level of the load current. The sampling circuit 114 may alternatively, or additionally, include comparators within the controller 112 (if available). The sampling circuit may also, or additionally, include a fast Analog to Digital converter (ADC) in the controller 112.

When a step load is applied to the power supply 100, e.g. when a half load changes to a full load nearly instantaneously, the load current changes very quickly. Each sample of the current is compared to the previous sample. When the change in the current, i.e. di/dt, reaches a predetermined threshold the sampling circuit 114 determines that the load is changing rapidly and that the duty cycle of the switching device Q1 should be adjusted in order to minimize voltage overshoot and undershoot. The maximum rate of current change that the PFC boost power converter 102 can provide is determined by, among other things, the duty cycle of the switching device Q1. Therefore, adjusting the duty cycle changes how quickly the PFC boost power converter 102 can respond to the changing load and thereby changes how much voltage overshoot or undershoot is generated. The current is sampled at a frequency sufficient to detect changing current before the output voltage changes. This allows the controller 112 to respond quickly to the changing output current.

The sampling circuit 114 determines an adjustment to the duty cycle of the switching device. This can be accomplished numerous ways. The sampling circuit 114 may include a predetermined lookup table that has been calibrated to provide a desired duty cycle adjustment based on one or more operating parameters such as input conditions, output voltage, output current and rate of change of output current. The adjustment to the duty cycle may also be determined by equation. Thus in order to improve the response of the PFC boost power converter 102 to the step load change, the sampling circuit 114 overrides the duty cycle set by the voltage control loop of the controller 112 and adjusts the duty cycle according to the duty cycle adjustment previously determined. The duration of this adjustment can be set/determined in numerous ways. The duration can, for example, be a set length of time, a number of switching cycles, or can last until a steady state is achieved. Whichever manner of determining the duration is used, voltage control of the duty cycle is taken over again by the controller 112 when the duration of the adjustment ends.

The adjusted duty cycle may be derived from two components. The first component is the duty cycle provided by the controller 112 based on, for example, a reference and the output voltage level. When the power converter 102 is operating at steady state, this is the only component for derivation of the adjusted duty cycle. The second component can be implemented by using the load current as an additional input to the controller 112 for calculating the duty cycle. The second component for the adjusted duty cycle can be provided by a non-linear component. The non-linear component will modify or replace the original duty cycle to achieve the adjusted duty cycle when the output current to the load changes rapidly. The determination of the amount to be added to (or subtracted from) the original duty cycle may be based on an equation or a look-up table. The equation or look-up table can be generated by simulation and then fine tuned by actual testing.

By way of example, assume the power supply 100 is operating in steady state at 50% load and drawing 2 A of input current. If a step load is applied to the output of the power supply at a certain slew rate, it would result in a current slew rate on the input side that depends on the step-up or step-down ratio of the power supply. For example, if the load current steps from 50% to 100% at a rate that requires the input current to increase from 2 A to 4 A in 40 microseconds, it will result in a slew rate of 50 milliamps per microsecond.

While the current is increasing, the extra 2 A of current required will be supplied by the bulk capacitor 118. Because the bulk capacitor 118 is chosen to have a large capacitance, it does not discharge appreciably in this time. However, there will be a small drop in the voltage input to the switching power converter 104 due to the equivalent series resistance (ESR) of the capacitor 118. Because the drop in voltage caused by the ESR of the capacitor is very small, the controller 112 may not recognize the change. Additionally, the controller 112 is sampling the voltage at a slow frequency. Thus, it will take some time before the controller 112 samples the voltage and recognizes that the voltage has changed. If the voltage is sampled at, for example 2 kHz, the voltage is only sampled once every 500 microseconds. As the current ramps up completely in 40 microseconds, it is quite likely that the voltage will not be sampled while the current is increasing. The sampling circuit 114, however, is sampling the current at a frequency greater than the voltage sampling frequency. The exact frequency depends upon the controller 112, ADCs and/or other elements selected for the sampling circuit 114, but a frequency of 100 kHz is a reasonable example. Therefore, the sampling circuit is sampling the current once every 10 microseconds and would acquire four samples during the 40 microseconds required for the current to reach 4 A.

During this time, each current sample is quite large as compared to the previous value. When the change in current reaches a threshold value, the sampling circuit 114 will determine a new duty cycle for the switch Q1. This sampling circuit 114 may determine the new duty cycle by retrieving the adjustment from a pre-calibrated look up table as discussed above. The sampling circuit then overrides the voltage control portion of the controller 112 to change or augment the duty cycle to the new duty cycle for a pre-determined time. Thus, while the load current ramps from 2 A to 4 A, each current sample may result in an increase in the duty cycle of the switching device Q1. This adjusted duty cycle can be as high as 100%. The adjusted duty cycle will stay at this level for a certain duration as discussed above unless there is a substantial change in load current. Eventually, voltage control of the duty cycle is taken over again by the controller 112 when the duration of the adjustment ends.

Similarly, when the output current of the power converter 102 ramps down due to step un-load, the sample circuit 114 is operable to respond very quickly and decrease the duty cycle to help minimize voltage overshoot. During step unloading, the duty cycle of Q1 will be reduced for a certain duration as discussed above. The reduced duty cycle can be as low as a 0% duty cycle.

Figure 2:
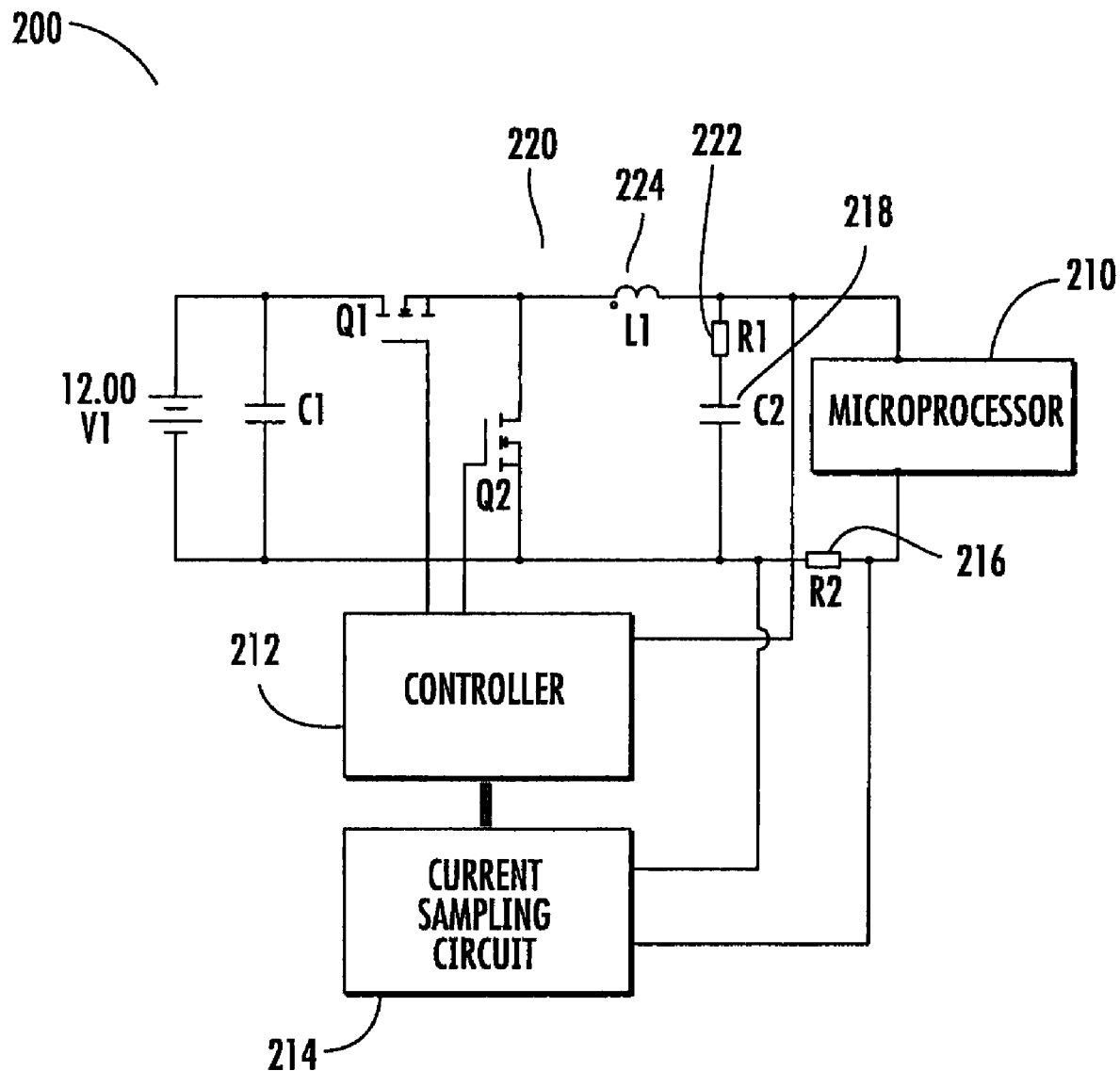
FIG. 2 is a circuit diagram of a voltage regulator module (VRM) system according to another embodiment of the present disclosure.

Another example embodiment is illustrated by the VRM system 200 of FIG. 2. The VRM 220 receives a DC input voltage and provides an output voltage to a load 210. The load is illustrated a microprocessor, but the load can be any load with which a VRM can be used. Similar to the circuit in FIG. 1, a controller 212 samples the output voltage supplied by the VRM 220 at a first frequency and an output current is sampled at a second frequency. In FIG. 2, the current is illustrated being sampled by a sampling circuit 214. The sampling circuit 214 may be a part of the controller 212, external circuitry or a combination of the two. The current is sensed using a series sense resistor 216. Any other device capable of sensing the current, such as a current transformer, Hall Effect sensor, etc., can also be used instead of, or along with, the sense resistor 216.

In this example, the VRM 220 operates on a 12V input to produce an output voltage of 1.2V and delivers maximum load current of 20 A. It operates at 1 MHz switching frequency and uses 0.2 uH output inductor and is placed close to its load. The load can change current at a rate of 100 A per microsecond. Specifications allow a maximum 50 mV overshoot and/or undershoot in the voltage provided to the load. The ESR of output capacitor 218 is shown as resistor 222. The capacitor 218 is chosen such that its ESR is half the resistance of the sense resistor 216.

The current sampling circuit 214 includes four comparator circuits configured to detect when load current changes in steps of 25% of the maximum possible change. The current detection signal from the sense resistor 216 can also be amplified using a precision, low offset differential amplifier and fed to an Analog to Digital Converter (ADC) of the controller 212 for processing. A typical fast comparator and fast controller 212 can perform this task in 50 to 75 nanoseconds.

When the current required by the load ramps up from 5 A to 20 A at a rate of 100 A per microseconds, the change in output current will occur in 150 nanoseconds. The comparators recognize the change in current and trigger an interrupt signal. During the 50 to 75 nanoseconds required to perform this task, the extra load current of 15 A is supplied by the capacitor 218. During this time, the capacitor would discharge by 7 mV. Because of the capacitor discharging, the voltage drop across the sense resistor 216, and the voltage drop across the resistor 222, the voltage provided to the load will decrease by approximately 22 mV. The controller 212 changes the duty cycle to nearly 100% and current in the VRM inductor 224 will start to increase. The rate of increase in current will depend on the value of the inductor. When 10.8V is applied across a 0.2 uH inductor, the current will ramp up at the rate of 54 A per microsecond. Thus, total ramp up from 5 A to 20 A would take 277 nSec. During this time, the capacitor 218 will supply approximately half of the extra 15 A current. This results in further discharge of the capacitor 218 to a voltage of 1.16V. Thus, the output voltage remains within the allowable 50 mV undershoot of the desired 1.2V.

In this embodiment, the current ramp rate in the inductor is predictable, and the modified duty cycle can be used for a predetermined length of time. Thus, the duty cycle is increased to approximately 100% for only 277 nanoseconds when the load switches from 5 A to 20 A. After that time, the controller is allowed to resume voltage control of the duty cycle.

Figure 3:
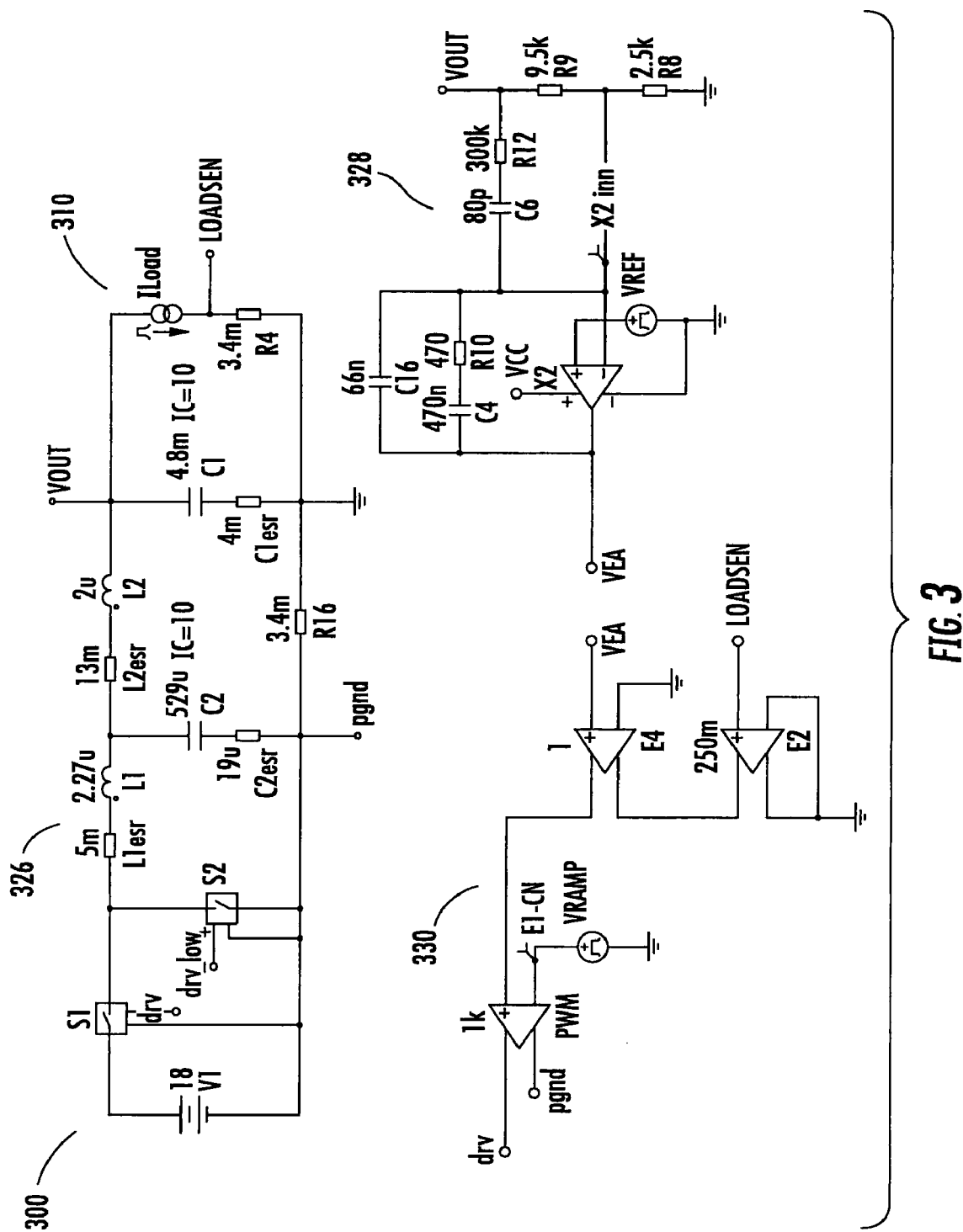
FIG. 3 is a circuit diagram of an example analog implementation of a power converter including an analog circuit for adjusting the duty cycle of the power converter in response to a step load change.

FIG. 3 illustrates an analog circuit 300 according to one or more aspects of the present disclosure for providing power to a load 310. The circuit 300 includes a power converter 326 providing an output voltage to the load 310. The circuit 300 includes a voltage error amplifier 328 for amplifying the error in the voltage supplied to the load 310. The circuit 300 further includes an integrated current sampling and control circuit 330.

Figure 4:
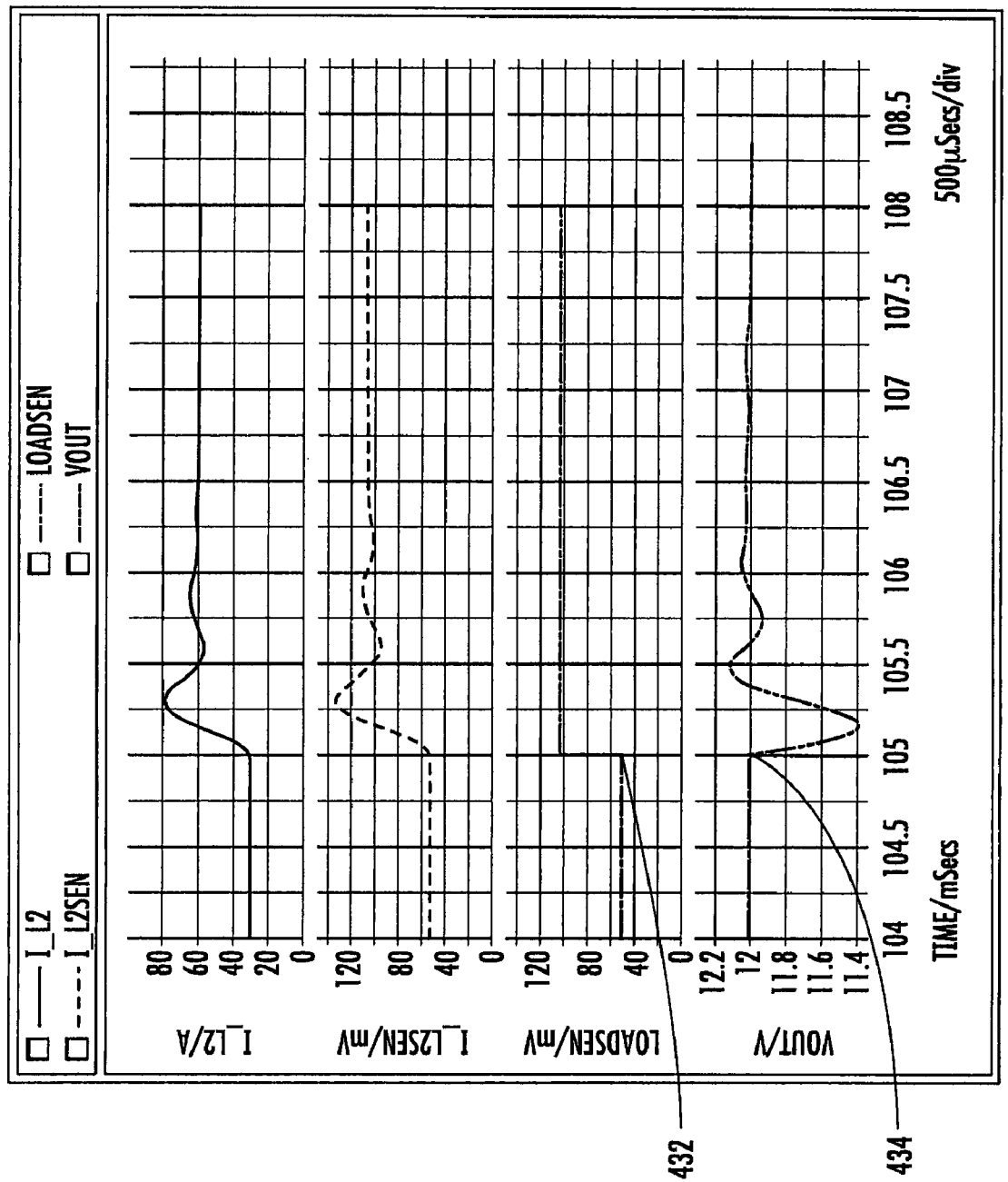
FIG. 4 is a graph of the current and voltage effects of a step increase in load on the power converter in FIG. 3 without load current sensing.

FIG. 4 graphically illustrates the effects of a step change in load on the output voltage of the power converter 326 of FIG. 3 if the current sampling and control circuit 330 is not used. The power converter 326 is subjected to a step load change from 30 A to 60 A at a rate of 5 A per microsecond. At 432 this step change can be seen in a change in the voltage across a series sense resistor R4 in the power converter 326. As illustrated at 434, the voltage output from the power converter 326 spikes down when the load changes suddenly. By the time the current in the power converter's inductor has increased sufficiently to overcome this decrease in voltage, the voltage has dropped from 12 volts to 11.4 volts. As time continues, the voltage increases until it overshoots the steady state 12 volts. This pattern continues until the current through the inductor and the output voltage reach a steady state again.

Figure 5:
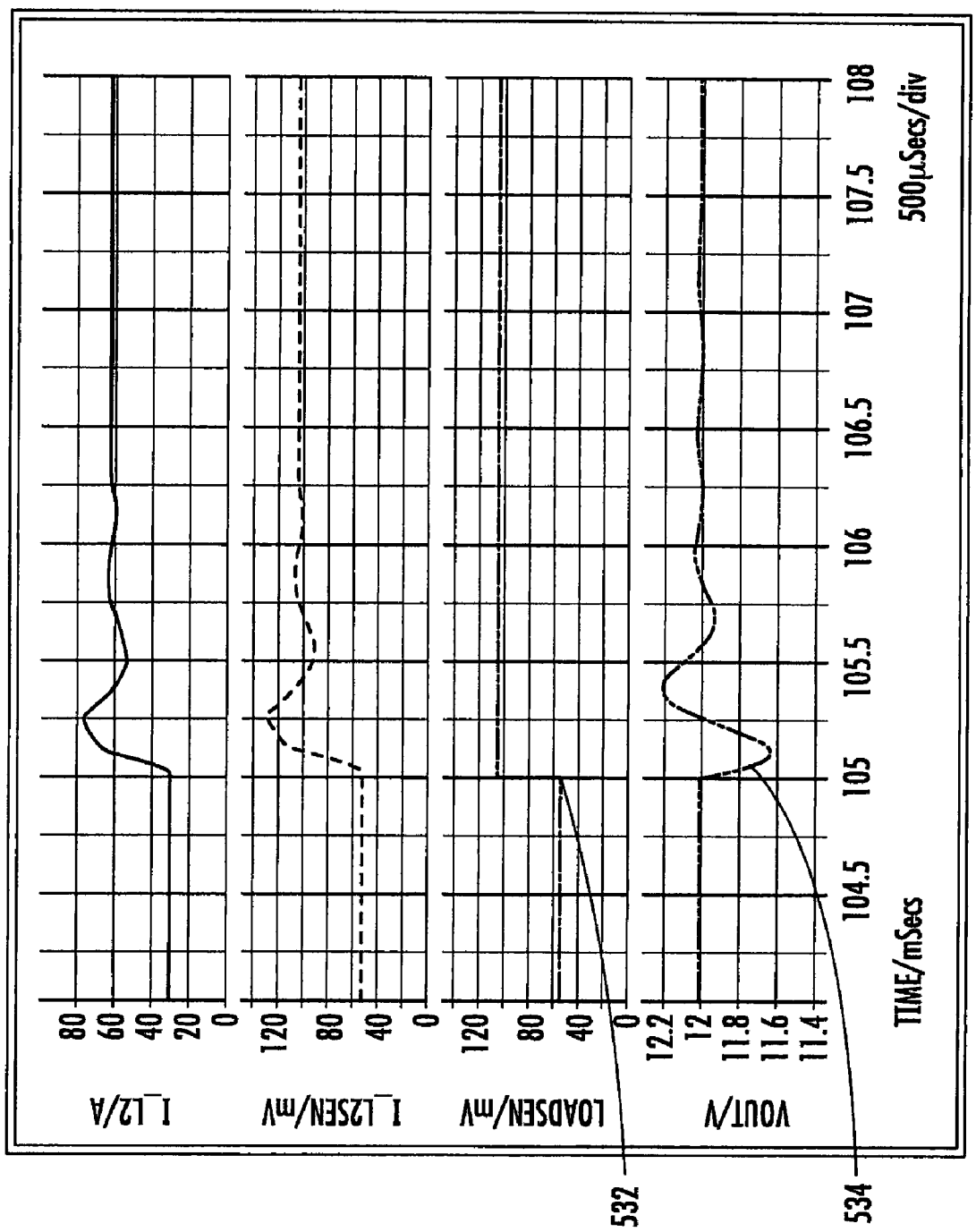
FIG. 5 is a graph of the current and voltage effects of a step increase in load on the power converter in FIG. 3 with load current sensing and proportional current control.

FIG. 5 illustrates the effects of the same step load change on the circuit 300 in FIG. 3 when the current sampling and control circuit 330 is used. At 532, the power converter is subjected to the same 30 A to 60 A load change. Although the output voltage still dips at 534, the minimum value of the output voltage is approximately 11.65 volts. Thus the voltage drop caused by the change in load is reduced by more than 0.2 volts as compared the results shown in FIG. 4.

Figure 6:
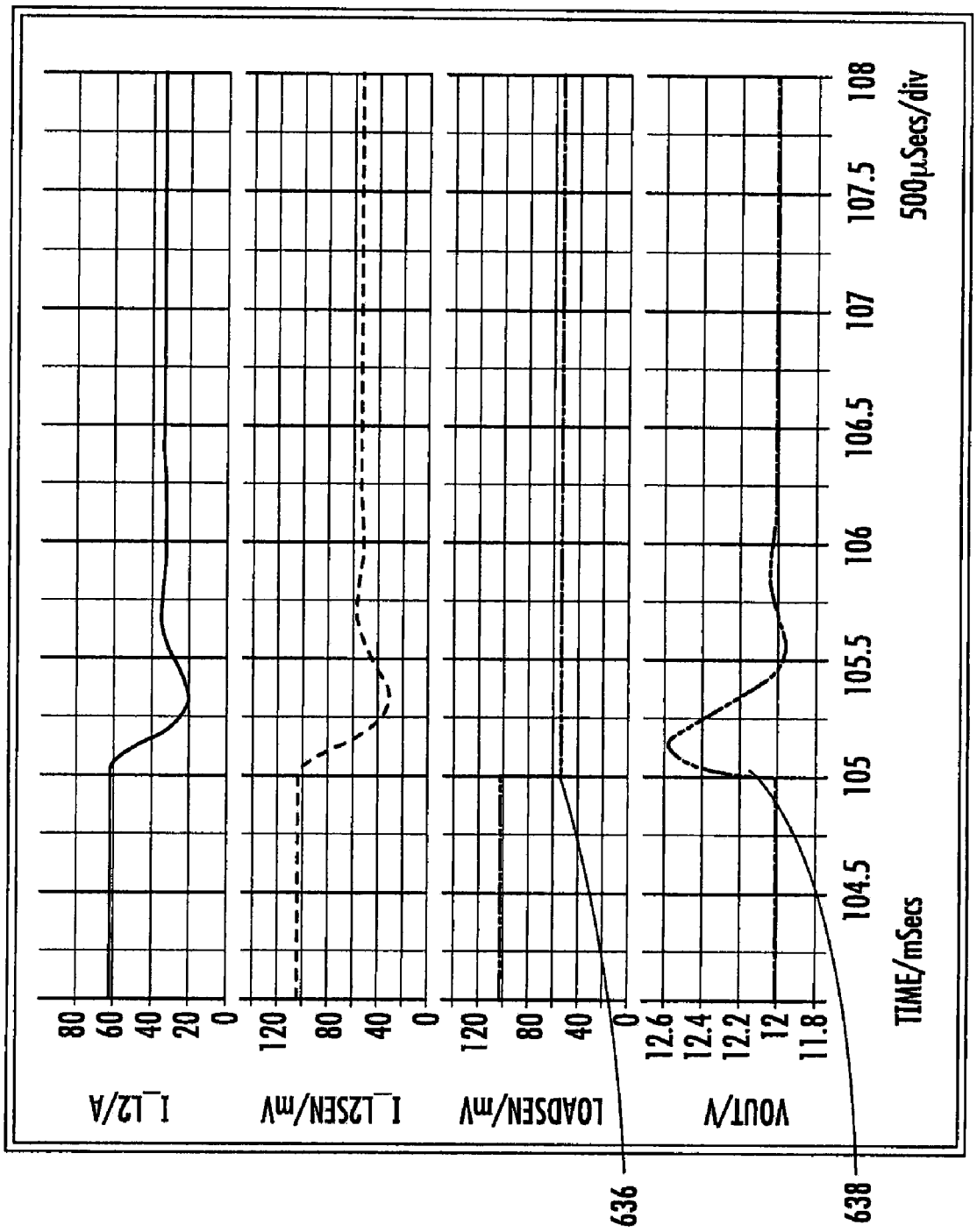
FIG. 6 is a graph of the current and voltage effects of a step decrease in load on the power converter in FIG. 3 without load current sensing.
Figure 7:
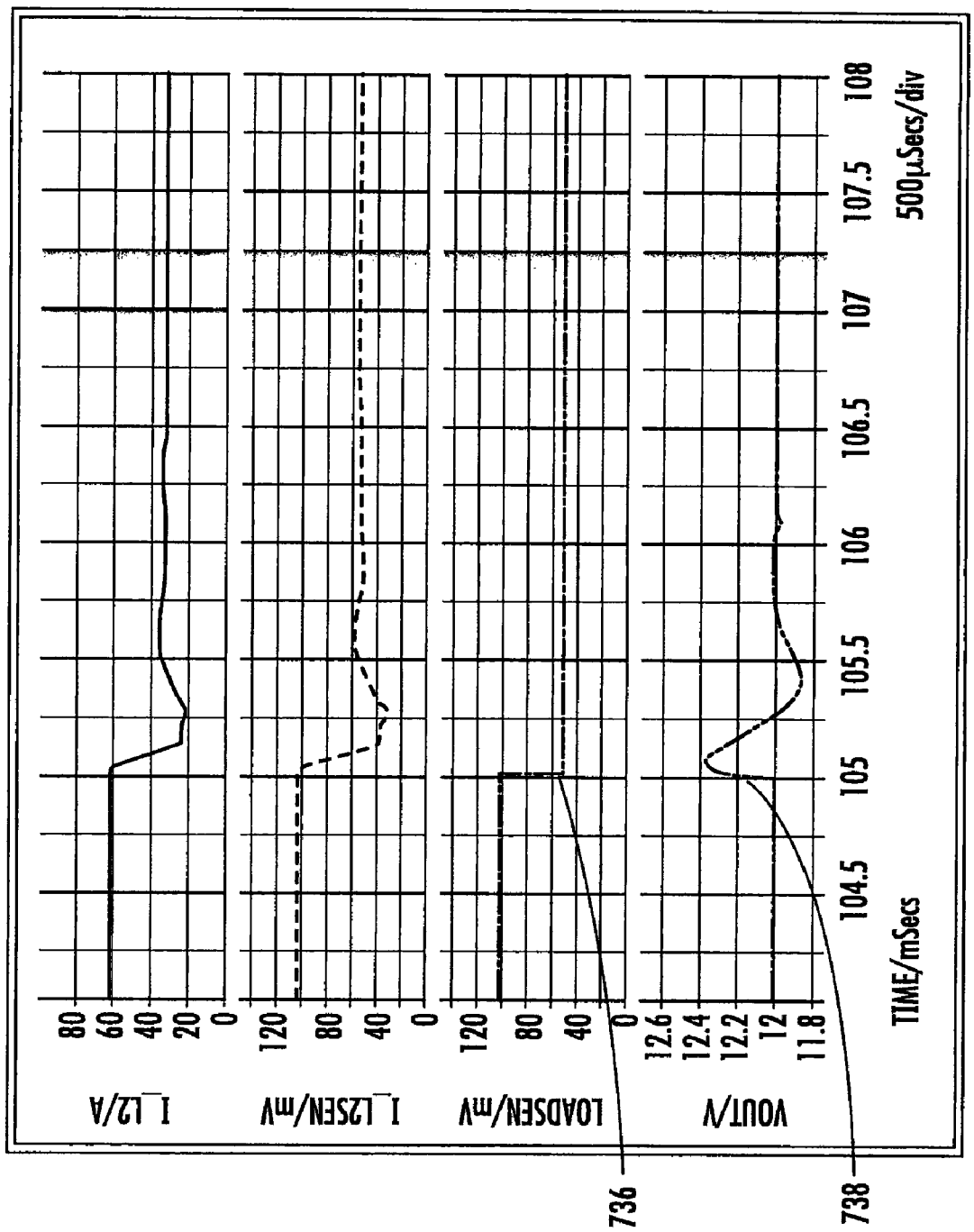
FIG. 7 is a graph of the current and voltage effects of a step decrease in load on the power converter in FIG. 3 with load current sensing and proportional current control.

FIGS. 6 and 7 similarly illustrate the response of the power converter 326 to a step decrease in load. The step change in the load is a decrease from 60 A to 30 A at a rate of 5 A per microsecond. FIG. 6 illustrates the response when the current sampling and control circuit 330 is not used. The load change is evident in the change in voltage across the sense resistor R4 at 636. The voltage output from the power converter 326 spikes up from the steady state 12V output in response to the sudden change in load and peaks at 12.6V. In contrast, the results of the power converter 326 being subjected to the same step decrease in load when the current sampling and control circuit 330 is used are shown in FIG. 7. Like FIG. 6, the change in load can be seen in the voltage across the sense resistor R4 at 736. Similarly, the output voltage of the power converter 326 spikes up from the steady state 12V at 738. However, the output voltage peaks below 12.4 volts. As with the response to the step increase in load, using the current sampling and control circuit 330 reduced the peak voltage overshoot by more than 0.2 volts.

The foregoing description of example embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method of controlling a power converter having an output capacitor, a current sensor positioned on an output side of the output capacitor and at least one switching device for supplying an output voltage and a load current to a load, the method comprising:

sampling sensing the output voltage; the load current at a frequency sufficient to detect changing load current before the output voltage of the power converter changes;

controlling a duty cycle of the switching device according to the sensed output voltage and a voltage control loop when a rate of change of the load current does not exceed a threshold level greater than zero; and adjusting the duty cycle of the switching device set by the voltage control loop when the rate of change of the load current exceeds the threshold level greater than zero.

2. The method of claim 1 wherein adjusting includes adjusting the duty cycle of the switching device before sensing a change in the output voltage due to the rate of change of the load current.

3. The method of claim 2 wherein adjusting includes increasing the duty cycle of the switching device when the load current is increasing, and decreasing the duty cycle of the switching device when the load current is decreasing.

4. The method of claim 2 wherein said frequency is a first frequency, wherein sensing the output voltage includes sampling the output voltage at a second frequency, and wherein the first frequency is greater than the second frequency.

5. The method of claim 1 wherein adjusting includes adjusting the duty cycle of the switching device according to the sampled load current.

6. The method of claim 1 wherein the power converter is a DC-DC converter.

7. The method of claim 1 wherein the power converter is a PFC boost converter.

8. The method of claim 1 wherein the power converter is a voltage regulation module (VRM).

9. The method of claim 1 wherein the power converter includes a digital controller for controlling and adjusting the duty cycle of the switching device.

10. The method of claim 9 wherein the digital controller is configured to perform the sensing and the sampling.

11. A power converter comprising an output capacitor, a current sensor positioned on an output side of the output capacitor, a controller and at least one switching device, the power converter configured to sample a load current at a frequency sufficient to detect changing load current before an output voltage of the power converter changes, the controller configured to control a duty cycle of the switching device according to a sensed output voltage and a voltage control loop when a rate of change of the load current does not exceed a threshold level greater than zero, and to adjust the duty cycle of the switching device set by the voltage control loop when the rate of change of the load current exceeds the threshold level greater than zero.

12. The power converter of claim 11 wherein said frequency is a first frequency, wherein the power converter is configured to sample the output voltage at a second frequency, and wherein the first frequency is greater than the second frequency.

13. The power converter of claim 12 wherein the controller is configured to again control the duty cycle of the switching device according to the sensed output voltage and the voltage control loop a set duration after the rate of change of the load current exceeds the threshold level greater than zero.

14. The power converter of claim 11 wherein the controller is configured to sample the output voltage.

15. The power converter of claim 14 wherein the controller includes a sampling circuit for sampling the load current.

16. The power converter of claim 15 wherein the controller is a digital controller.

17. The power converter of claim 11 further comprising a sampling circuit for sampling the load current.

18. The power converter of claim 11 wherein the power converter is a DC-DC converter.

19. The power converter of claim 11 wherein the power converter is a PFC boost converter.

20. The power converter of claim 11 wherein the power converter is a voltage regulation module (VRM).

21. The power converter of claim 11 wherein the controller is configured to compare the rate of change of the load current to the threshold value greater than zero.

* * * * *

UNITED STATES PATENT AND TRADEMARK OFFICE
CERTIFICATE OF CORRECTION

| | | |
|---|---|---|
| PATENT NO. | : 8,232,786 B2 | Page 1 of 1 |
| APPLICATION NO. | : 12/236798 | |
| DATED | : July 31, 2012 | |
| INVENTOR(S) | : Phadke et al. | |

It is certified that error appears in the above-identified patent and that said Letters Patent is hereby corrected as shown below:

In claim 1, column 8, lines 1-4, replace "sampling sensing the output voltage; the load current at a frequency sufficient to detect changing load current before the output voltage of the power converter changes;" with:

"sensing the output voltage;

sampling the load current at a frequency sufficient to detect changing load current before the output voltage of the power converter changes;"

Signed and Sealed this
Eighteenth Day of December, 2012

David J. Kappos
*Director of the United States Patent and Trademark Office*